United States Patent [19]

Jorgensen

[11] Patent Number: 5,272,464
[45] Date of Patent: Dec. 21, 1993

[54] CENTRALIZED AUTOMOTIVE RESOURCE MANAGEMENT SYSTEM

[76] Inventor: Adam A. Jorgensen, 915 Middle River Dr., Suite 415, Fort Lauderdale, Fla. 33304-3585

[21] Appl. No.: 937,433

[22] Filed: Aug. 13, 1992

Related U.S. Application Data

[63] Continuation of Ser. No. 512,930, Apr. 23, 1990, abandoned.

[51] Int. Cl.$^5$ ............................................. B60Q 1/00
[52] U.S. Cl. .................................. 340/438; 340/459; 340/460; 340/461
[58] Field of Search ............... 340/438, 459–462, 340/517, 518, 521, 525

[56] References Cited

U.S. PATENT DOCUMENTS

| | | | |
|---|---|---|---|
| 3,987,439 | 10/1976 | Spaniola | 340/461 |
| 4,053,868 | 10/1977 | Cox et al. | 340/461 |
| 4,092,642 | 5/1978 | Green et al. | 340/459 |
| 4,222,031 | 9/1980 | Okamoto et al. | 340/459 |
| 4,287,503 | 9/1981 | Sumida | 340/518 |
| 4,438,422 | 3/1984 | Nojiri et al. | 340/460 |
| 4,500,868 | 2/1985 | Tokitsu et al. | 340/459 |
| 4,506,337 | 3/1985 | Yasuhara | 340/438 |
| 4,866,616 | 9/1989 | Takeuchi et al. | 340/459 |
| 4,910,496 | 3/1990 | Hatanaka et al. | 340/438 |

Primary Examiner—Donnie L. Crosland
Attorney, Agent, or Firm—Oltman and Flynn

[57] ABSTRACT

In accordance with the invention there is provided a central vehicle resource management system including vehicle status sensing apparatus for generating a plurality of vehicle status signals, central electronic logic interpretation apparatus coupled to the status signals for interpreting the status signals, and central annunciating apparatus coupled to an output of the interpretation apparatus for annunciating to a vehicle's driver interpreted status indications.

13 Claims, 6 Drawing Sheets

| STATE | STATE SIGNAL | DERIVED FROM |
|---|---|---|
| BACKUP LIGHTS ON | BUL | BACKUP LIGHT SENSE |
| DAYLIGHT ON | DL | LIGHT SENSOR |
| ENGINE RUNNING | ENG | GEN. OUTPUT & OIL PRESS. |
| ENGINE TEMP. HIGH | ENGT | TEMP. SENSOR |
| FOOT BRAKE SYST'S OK | FBR | PRESSURE SENSORS |
| GEAR IN REVERSE | GRV | REVERSE GEAR SWITCH |
| GENERATOR CHARGING | GEN | GENERATOR CONTROL |
| HAND BRAKE ON | HBR | BRAKE SWITCH |
| IGNITION ON | IGN | IGNITION SWITCH |
| LIGHTS ON | LS | LIGHT SWITCH |
| OIL PRESS. ON | OPR | OIL PRESSURE SENSOR |
| STARTER ON | STT | STARTER SWITCH |
| TURN SIGNAL ON | TSIG | TURN SIGN. SWITCHES |
| WINDSHIELD WIPERS ON | WW | WINDSHIELD WIPER SWITCH |
| BRAKE LIGHTS ON | BRL | BRAKE LIGHT SENSE |
| FOOT BRAKE ON | FTBR | BRAKE SWITCH |
| ENGINE OVERHEAT | EOH | ENGINE TEMP. SENSE |
| TIMER ELAPSED | TIM' | TIMER |

FIG. 3

| BOOLEAN COMBINATION | ANNUNCIATION |
|---|---|
| LS·ENG' | TURN OFF LIGHTS |
| LS·DL·WW' | TURN OFF LIGHTS |
| LS'·WW | TURN ON LIGHTS |
| LS'·DL'·ENG | TURN ON LIGHTS |
| BUL·GRV·ENG' | BACKUP LIGHT FAULTY |
| OP'·ENG | NO OIL PRESSURE-SERV. REQD |
| DL·LS·ENG' | TURN OFF LIGHT |
| TSIG·TIM' | RESET TURN SIGNALS |
| IGN·ENG'·TIM' | TURN OFF IGNITION |
| HBR·STT | RELEASE HAND BRAKE |
| FTBR·BRL' | BRAKE LIGHTS FAULTY |
| FBR·LOCKIN·TIM' | SERVICE BRAKES |
| EOH·ENG·TIM' | ENGINE OVERHEATING |
| STT·IGN | ENGINE IS RUNNING |
| GEN'·ENG | GENERATOR FAULTY |

FIG. 6

000# CENTRALIZED AUTOMOTIVE RESOURCE MANAGEMENT SYSTEM

This application is a continuation of application Ser. No. 07/512,930, filed Apr. 23, 1990, now abandoned.

The invention relates to an automotive resource management system and particularly to a centralized resource management system for providing a driver with resource status feedback.

BACKGROUND AND PRIOR ART

Modern automobiles are, as is well known, equipped with a number of resources that assist the driver in controlling the vehicle and in monitoring the operability of the vehicle's various resources.

Typical of such resources are the vehicle's external light systems, brakes, windshield wipers, turn signals, back-up lights, brake lights, and engine status and warning signals, such as oil pressure, electric supply system, and so forth.

In operation of a vehicle, oftentimes signals are generated to warn the driver of impending trouble conditions which may or may not represent actual problems, but require interpretation and knowledge of other system conditions, before they can be properly interpreted and evaluated. As an example, most automobiles have some form of indication to inform the driver of low engine oil pressure. Low engine oil pressure, however, is not always an indication of an impending problem. For example, in case the engine is stalled while ignition is on, the oil pressure indication will come in, but since the engine is not running, absence of oil pressure is a perfectly normal condition. If announced simply as an oil pressure failure it will tend to unduly disturb a driver. A low oil pressure announcement should therefore be conditioned by an indication of whether the engine is running or not. As other examples of a vehicle resource linked to another resource is the windshield wipers which the driver will instinctively turn on in case vision is obscured by rain. In many states, however, it is also required that the headlights are turned on when the windshield wipers are running, or at least it is prudent of a driver to do so. Therefore, whenever a driver turns on the windshield wipers, it would be useful that a message, conditioned on presence of daylight, that the headlights should be turned on. As another example, many modern cars have two independent driving brake systems, and an indication of potential danger, if one of these brake systems is inoperative. This condition is, however, normally only indicated during short periods of time, for example after ignition is turned on, but before the engine is actually started. If one of the dual brake systems should fail, the brief indication may not be noticed by the driver, who may continue to drive with only partially operative brakes. It would therefore be better that the absence of a brake-in-order signal be combined with a lock-in signal, so that a faulty brake system would be announced in a locked-in condition that could be brought to the driver's attention before starting to drive.

Still other vehicle resources conditions may be combined to be interpreted and evaluated by suitable means and announced to the driver as will be described in more detail hereinbelow.

It is accordingly a primary object of the instant invention to provide a centralized resource management system for motor vehicles that overcomes the problem of adjusting the vehicle's resource status signals to a form that is readily evaluated and understood by the driver.

SUMMARY OF THE INVENTION

In accordance with the invention there is provided a central vehicle resource management system including vehicle status sensing apparatus for generating a plurality of vehicle status signals, central electronic logic interpretation apparatus coupled to the status signals for interpreting the status signals, and central annunciating apparatus coupled to an output of the interpretation apparatus for annunciating to a vehicle's driver interpreted status indications.

In accordance with a further feature there is provided a central motor vehicle resource management system which has timing means coupled to said interpretation apparatus for timing duration of the vehicle status signals.

In accordance with still another feature there is provided a central motor vehicle resource management system, wherein the timing apparatus includes a lock-in arrangement for locking-in at least one of the status signals.

In accordance with a further feature there is provided a central motor vehicle resource management system, wherein the timing apparatus includes a timeout arrangement for timing the duration of at least one of the resource status signals, or annunciating elapse of the status signal beyond a given time.

There may additionally be provided a plurality of electronic logic elements in the logic interpretation apparatus, and wherein optionally at least one of a visual display system, an acoustic system or a voice synthesis system is coupled to the annunciating apparatus.

In accordance with the invention, there may further be provided a central motor vehicle resource management system which includes a priority scanning arrangement coupled to the annunciating apparatus for assigning a priority to at least one of the resource status signals.

Furthermore, there may be provided a central motor vehicle resource management system which includes a digital computer coupled to the central electronic logic interpretation apparatus, and a data memory coupled to said digital computer for storing data and control programs for said digital computer.

Further objects and advantages of this invention will be apparent from the following detailed description of a presently preferred embodiment which is illustrated schematically in the accompanying drawings.

BRIEF DESCRIPTION OF THE DRAWINGS

FIG. 3 is a table showing as examples a number of vehicle conditions in a first column, the associated state signal abbreviation in the second column, and examples of sources for deriving the signals.

FIG. 6 is a table showing as examples various vehicle conditions expressed in Boolean notation, and their annunciation.

DESCRIPTION OF THE PREFERRED EMBODIMENTS

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
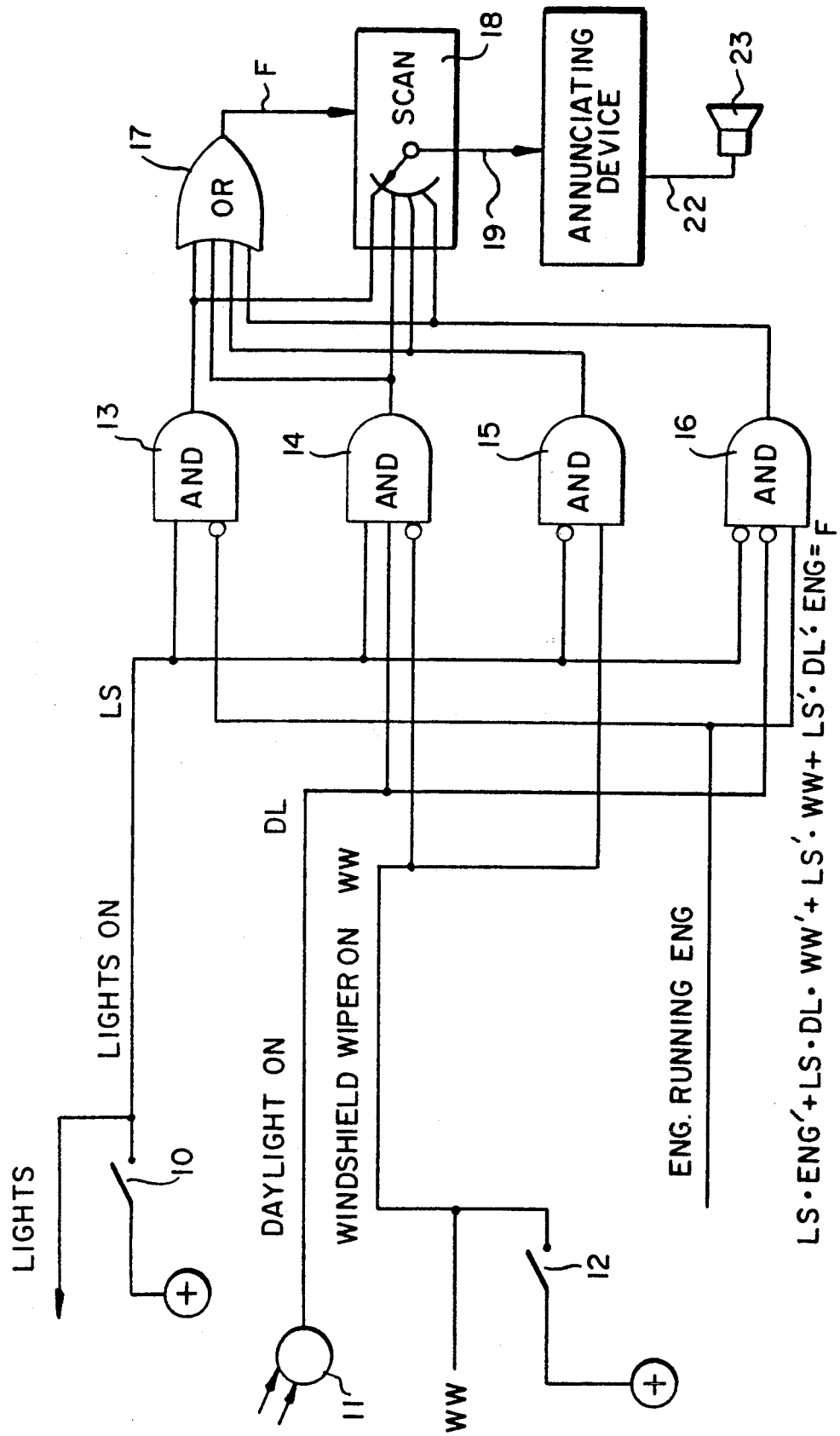
FIG. 1 is a circuit diagram of a simplified embodiment of the invention.

FIG. 1 is a circuit diagram of the invention, shown in simplified form, including the states "lights on", "daylight on", "windshield wiper on", and "engine running". These states are represented by the respective state signals LS, DL, WW, and ENG. The state signal LS is derived from a light switch 10, which is the light switch normally present in any vehicle. The light switch 10 may advantageously be the headlight switch. The light switch 10 has one pole connected to the vehicle positive power bus and another pole connected to the vehicle lights. The potential applied to the lights is simultaneously used to represent the state signal LS.

The state "daylight on" (DL) is generated by a suitable light sensor 11 positioned at a suitable location of the vehicle. The light sensor may advantageously be a photo transistor with an amplifier as described in more detail below. The "windshield wiper on" state (WW) is advantageously derived from the windshield wiper switch in a manner similar to the light switch 10. The "engine running" state (ENG) may be derived in various ways. It may advantageously be derived by OR-combining a "generator charging" (GEN) signal with an "oil pressure on" (OPR) signal as described below. An electronic logic interpretation arrangement which includes a number of AND-gates 13, 14, 15 and 16 each having an output lead connected to respective inputs of an OR-gate 17, having an output which generates an output signal F, representing a vehicle state which requires the driver's attention. AND-gate 13 represents the Boolean AND-combination of state signals LS (light switch on) and the inversion of the ENG state signal. The inversion of the ENG state signal is indicated by a small circle at the lower input of the AND-gate 13. The combination at the output of the first AND-gate 13 accordingly represents the state that the lights are on, and the engine is not running, which clearly requires the driver's attention. The second AND-gate 14 represents the states "lights on" (LS) "daylight on" (DL) and "windshield wipers on" (WW) inverted. This combination reminds a driver not to drive with lights on during daylight, unless the windshield wipers are on. The third AND-gate 15 represents the combination of lights off (LS') and windshield wipers on (WW), which reminds a driver to turn on the lights if the windshield wipers are turned on. The last AND-gate 16 represents the combination of light switch off (LS'), daylight off (DL') and engine running, which clearly is a combination that should be reported to the driver. The outputs of the AND-gates (131-16) are OR-ed in OR-gate 17 having an output F which indicates a condition that should be annunciated to the driver. The output F starts a scanner 18 to search for the active AND-gate, and stop at that gate. The position of the scanner is transmitted via scanner output lead 19 to an annunciating device 21 having an output 22 connected to a sounder 23. The scanner 18 insures that in case two or more AND-gates call simultaneously, one AND-gate is reported at the time. In a further development, the annunciator may have a display that shows which condition is causing the annunciator to start, or a voice synthesis device may be used to call the driver's attention to the particular condition, as described in more detail below.

The four activating combinations are shown in Boolean notation at the bottom of FIG. 1, which shows four OR-ed elements, each consisting of at least two AND-ed elements of state signals. An apostrophe after an element indicates its inverted state. For example LS signals "lights on", while LS' indicates "lights off". The results of the Boolean equation is equal to the signal F at the output of OR-gate 17.

It should be noted that the particular state signals shown in FIG. 1 are only to be considered to be examples of a much larger number of signals that could be included. FIG. 3 shows in tabular form a greater number of state signals each with an abbreviation and its source.

Figure 2:
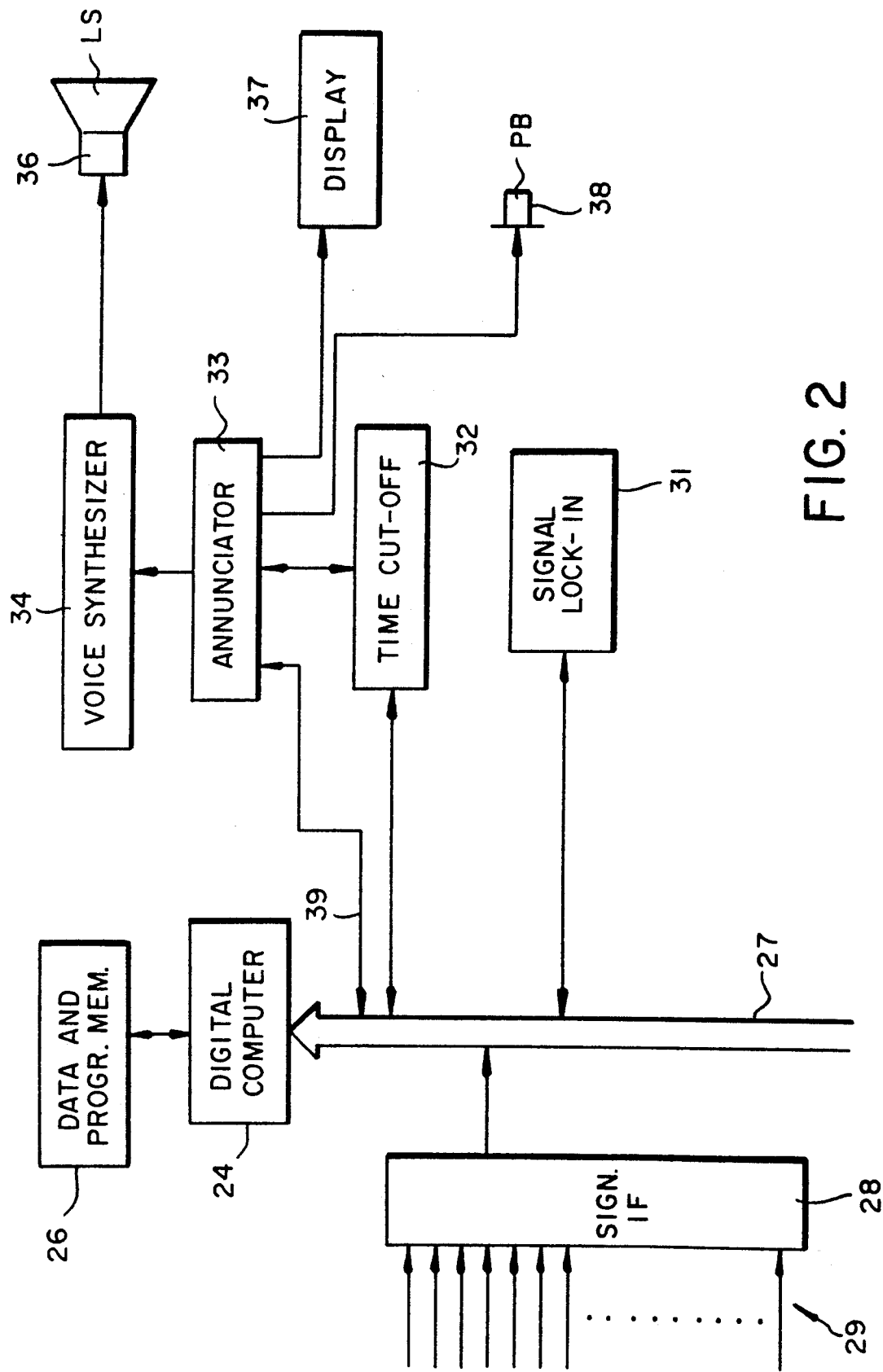
FIG. 2 is a block diagram of an embodiment of the invention based on a digital computer.

FIG. 2 shows an embodiment of the invention that uses a digital computer to perform the functions of the AND-gates 13-16 and OR-gate 17.

Most motor vehicles now contain at least one digital computer that performs various engine control functions, and other vehicle controls. Such computers typically have spare capability that can be utilized to perform the combinational logic functions of the aforesaid AND-and OR-gates. It is well known that Boolean arithmetic is readily performed by digital computers, by means of a properly structured program in the computer's memory.

In FIG. 2, a digital computer 114 has a data and program memory 26 and a common data bus 27, to which various function blocks are connected. The blocks are: a signal interface 28 which receives a number of status signals 29 of the types shown in FIG. 3 and other status signals as may be found to be necessary, depending upon the type and use of the vehicle.

It follows that the signal interface 28 need not be all in one location but can be subdivided with various parts located at various locations of the vehicle, and that in such case the bus 27 may be run to any subdivided part of the interface. The status signals 29 are repeatedly scanned by the computer 24, and their active presence is stored in corresponding bits in the data and program memory 26. Additional utility can be attained by adding certain timing functions to the state signals. Certain state signals may appear only momentarily, but can then be locked in, for example by means of a signal lock-in circuit, which has a memory element, e.g. a flip-flop, that can be set and used to "remember" the brief appearance of such a brief signal.

Typical of such a brief state signal would be absence of a dual foot brake warning signal, or presence of a "low-fuel" signal which may appear only briefly due to the slushing of fuel in the fuel tank. The brief state signals can also be locked in by setting a corresponding bit in the data and program memory 26. A time cut-off circuit 32 serves to time a state signal which has persisted for a longer time than normally required. For example a turn signal left on for an extended time can be timed and announced after the lapse of a given time. The time-out function, as well as the signal lock-in function, need not be performed by means of physical circuits 31, 32, but can all simply be performed in well-known manner by the digital computer 24 and a proper program in the data and program memory 26. The annunciator 33 is controlled by the digital computer 24 via busses 27, 39, and is connected to a visual display 37 that may display the various conditions or combinations of state signals of which the driver should be informed. Alternatively or cooperatively a voice synthesizer 34 connected to a loudspeaker LS may be provided, which in well known manner articulates conditions of which the driver is to be informed. A push-button 38 serves to disable a persistent message which the driver wishes to discontinue, or to call out or repeat a given message.

FIG. 3 shows, as mentioned above, a listing of states, their state signal abbreviation and the elements from which they are derived. The list is only intended to show examples of state signals since many more signals could be included depending upon need and sophistication of the vehicle.

Figure 4A:
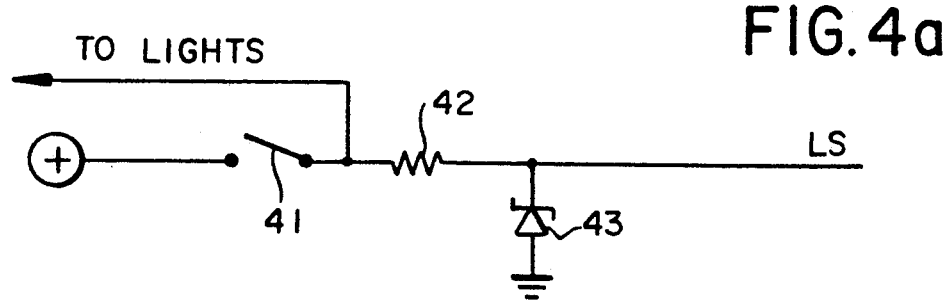
FIGS. 4A-4d are circuit diagrams showing as examples methods of deriving the status signals.
Figure 4B:
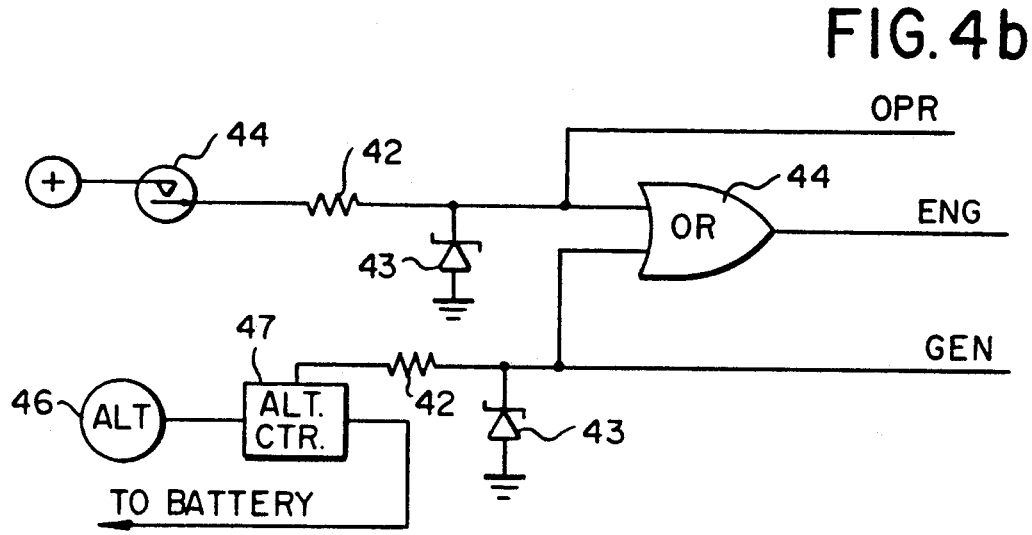
Figure 4C:
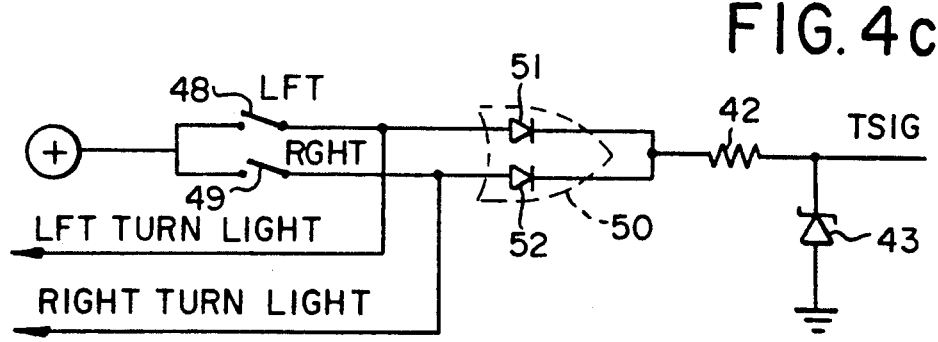
Figure 4D:
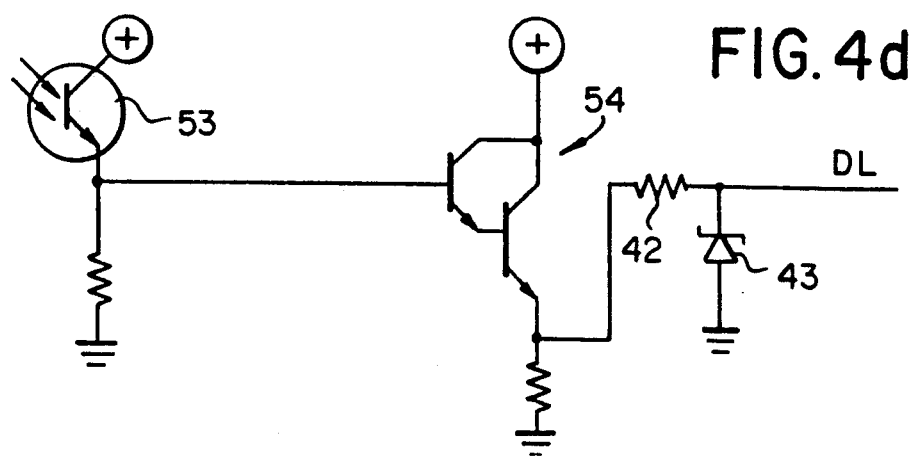

FIGS. 4A–4d shows examples of how state signals can be derived with only a small investment in additional hardware. Item a shows a status signal LS ("light on") derived from a light switch 41. Upon activation the light switch connects plus battery to the vehicle lights, e.g. head lights or head and parking lights. A current-limiting resistor followed by ground-connected zener diode, of for example 5 volts, develops a plus 5 volt logic signal LS when the light switch 41 is activated. FIG. 4b shows derivation of state signals OPR ("oil pressure on"), ENG ("engine running") and GEN ("generator charging"). An oil pressure sensor 44 generates a plus potential at current-limiting resistor 42 followed by zener diode 43, which generates status signal OPR when oil pressure is present. Engine alternator or generator 46 generates a positive output potential which can be tapped off, either from the alternator output directly or from the alternator control 47, again moderated by current-limiting resistor 42 and zener diode 43 to produce the "generator charging" status signal GEN. The two signals OPR and GEN are combined in OR-gate 44 to generate an "engine running" signal ENG. Should either the oil pressure signal OPR or generator charging signal GEN fail, the engine running signal ENG will still be valid, and can be used in other combinations, for example to generate a warning signal if the ignition key is turned to starter-on position while the engine is running, which could damage the start motor. FIG. 4c shows the derivation of the turn signal TSIG from the left turn signal switch 48, and right turn signal switch 49, followed by a "pseudo OR-gate" 50, shown in dashed lines, consisting of diodes 51, 52 and the current limiting resistor 42 and zener diode 43. FIG. 4d shows the derivation of the "daylight on" status signal DL. A photo transistor 53 is mounted on the vehicle in a location that allows detection of daylight, and is connected from the emitter to the input of a Darlington amplifier 54, again followed by a current-limiting resistor 43 and zener diode 43. The circuit of FIG. 4d can also be used to detect presence of vehicle lights, such as head lights, brake lights or back up lights, if the sensor is mounted inside a light housing. As shown in FIGS. 4a–4d all or most status signals can be generated with a very low investment in additional circuitry.

Figure 5:
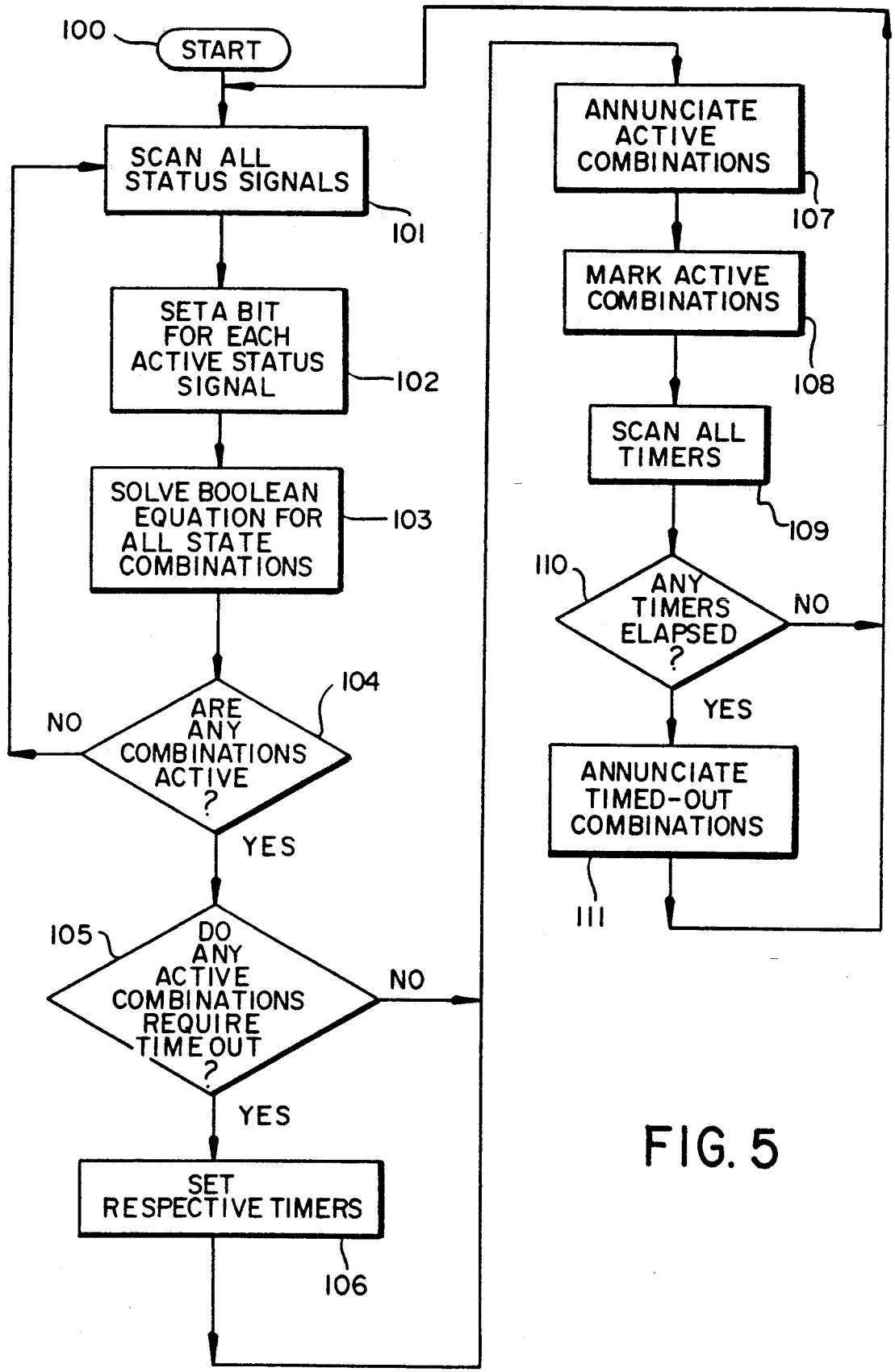
FIG. 5 is a flow chart showing the major steps in the operation of the invention.

FIG. 5 is a flow chart showing the operation of the embodiment using a digital computer. According to FIG. 5, after start (100) the computer repeatedly scans all state signals 29; if an active status signal is detected a bit is set in memory for each active state signal (102). In step 103, the Boolean combinations shown in FIG. 6 are evaluated. A test for any active combination is made in step 104, followed by a test to see if any combinations require time out. If affirmative, a timer is set for each combination requiring time out (106). In step 107, any active combination is annunciated according to the table of FIG. 6. Each active combination that has been annunciated is marked in memory so that the annunciation is not repeated (108). All timers are scanned in step 109 and tested to see if any has timed out (110). Timed-out combinations are annunciated in step 111, and the program continues at step 101.

I claim:

1. A motor vehicle resource management system comprising vehicle status signal sensing means for sensing a plurality of vehicle status signals, electronic logic interpretation means coupled to said vehicle status sensing means for interpreting said vehicle status signals for presence of vehicle conditions to be interpreted, annunciating means coupled to an output of said logic interpretation means for annunciating to the vehicle's driver interpreted vehicle status signals; lock-in means coupled to said logic interpretation means for locking-in at least one of said vehicle status signals; at least one AND-forming means in said logic interpretation means having at least two AND-inputs and an AND-output for forming an AND-function at the AND-output, said AND-function representing simultaneous presence of a vehicle status signal at each of said AND-inputs, said AND-inputs connected to respective vehicle status signals, and at least one OR-forming means having at least one OR-input and an OR-output for forming an OR-function at the OR-output, said OR-input being connected to said AND-output of said AND-forming means, wherein said OR-output forms an output of said logic interpretation means connected to said annunciating means.

2. A motor vehicle resource management system according to claim 1, including timing means coupled to said logic interpretation means for timing duration of at least one of said vehicle status signals.

3. A motor vehicle resource management system according to claim 2, wherein said timing means include lock-in means for locking-in at least one of said vehicle status signals.

4. A motor vehicle resource management system according to claim 2, wherein said timing means include timeout means for timing duration of at least one of said vehicle status signals and annunciating duration of said vehicle status signal beyond a given time.

5. A motor vehicle resource management system according to claim 1 including a plurality of electronic logic elements in said logic interpretation means.

6. A motor vehicle resource management system according to claim 1 including at least one of a visual display system, an acoustic system and a voice synthesis system coupled to said annunciating means.

7. A motor vehicle resource management system according to claim 1, including priority scanning means coupled to said annunciating means for assigning a priority to at least one of said vehicle status signals.

8. A motor vehicle resource management system according to claim 1 including a digital computer in said electronic logic interpretation means for interpreting said status signals and a data memory coupled to said digital computer for storing data and control programs for said digital computer.

9. A motor vehicle resource management system according to claim 1, wherein said logic interpretation means are responsive to presence of at least two of said status signals for generating at least one of said interpreted vehicle status indications.

10. A motor vehicle resource management system according to claim 8 including timing means in said digital computer.

11. A motor vehicle resource management system according to claim 8 including voice synthesizer means coupled to said digital computer.

12. A motor vehicle resource management system according to claim 8 including priority assignment means in said digital computer.

13. A motor vehicle resource management system according to claim 8, including timing means, voice synthesizing means, and priority assignment means in said computer.

* * * * *